US012118399B2

(12) United States Patent
Wang (10) Patent No.: US 12,118,399 B2
(45) Date of Patent: Oct. 15, 2024

(54) RESOURCE ALLOCATION METHOD, DEVICE AND AUDIO-VISUAL PLAYBACK TERMINAL (71) Applicant: SHENZHEN CHUANGWEI-RGB ELECTRONICS CO., LTD., Shenzhen (CN)

(72) Inventor: Xiaorong Wang, Shenzhen (CN)

(73) Assignee: SHENZHEN CHUANGWEI-RGB ELECTRONICS CO., LTD., Shenzhen (CN)

( * ) Notice: Subject to any disclaimer, the term of this patent is extended or adjusted under 35 U.S.C. 154(b) by 425 days.

(21) Appl. No.: 17/256,958

(22) PCT Filed: Dec. 17, 2020

(86) PCT No.: PCT/CN2020/137307
§ 371 (c)(1),
(2) Date: Nov. 15, 2021

(87) PCT Pub. No.: WO2022/099856
PCT Pub. Date: May 19, 2022

(65) Prior Publication Data
US 2022/0350666 A1 Nov. 3, 2022

(30) Foreign Application Priority Data

Nov. 16, 2020 (CN) .......................... 202011278716.X
Nov. 16, 2020 (CN) ........................... 202011278770.4

(51) Int. Cl.
G06F 3/00 (2006.01)
G06F 9/50 (2006.01)
(52) U.S. Cl.
CPC .......... G06F 9/5038 (2013.01); G06F 9/5055 (2013.01)

(58) Field of Classification Search
CPC ....................................................... G06F 9/50
See application file for complete search history.

(56) References Cited

U.S. PATENT DOCUMENTS 5,862,325 A * 1/1999 Reed ...................... H04L 67/62
709/212
6,363,434 B1 3/2002 Eytchison
(Continued)

FOREIGN PATENT DOCUMENTS

CN 103024551 A 4/2013
CN 104461744 A 3/2015
(Continued)

OTHER PUBLICATIONS

Vijay Sivaraman, Virtualizing the Access Network via Open APIs. (Year: 2013).*
(Continued)

Primary Examiner — Lechi Truong
(74) Attorney, Agent, or Firm — Platinum Intellectual Property (57) ABSTRACT Provided are a method and apparatus for resource allocation and an audiovisual playback terminal. The resource allocation method is applicable to a resource allocation system in an audiovisual playback terminal. The audiovisual playback terminal includes multiple device entities. The resource allocation system includes a resource configurator and several service instances. The method includes: causing the resource configurator to respond to a path requesting request from at least one target service instance, each of the path requesting requests containing a device entity list required by the target service instance in implementation of a service function; allocating device entities according to a preset resource allocation rule according to the instance attribute and the device entity list of each target service instance to create a path for each target service instance, so that the (Continued)

target service instance can invoke the device entities in the corresponding path to achieve the corresponding service function.

9 Claims, 4 Drawing Sheets

(56) References Cited

U.S. PATENT DOCUMENTS

| | | | | |
|---|---|---|---|---|
| 6,671,262 | B1* | 12/2003 | Kung | H04L 65/1095 |
| | | | | 709/204 |
| 7,143,087 | B2* | 11/2006 | Fairweather | G06F 8/427 |
| | | | | 707/913 |
| 7,284,244 | B1 | 10/2007 | Sankaranarayan et al. | |
| 8,130,930 | B2* | 3/2012 | DeMent | H04M 3/42017 |
| | | | | 379/207.16 |
| 9,350,661 | B2* | 5/2016 | Murphy | H04L 41/122 |
| 10,659,338 | B1* | 5/2020 | Nataraj | H04L 43/0817 |
| 11,968,302 | B1* | 4/2024 | Kumar | H04L 9/0891 |
| 2008/0140786 | A1* | 6/2008 | Tran | G06Q 10/10 |
| | | | | 709/206 |
| 2012/0233628 | A1* | 9/2012 | Ling | G06F 9/54 |
| | | | | 719/328 |
| 2014/0223099 | A1* | 8/2014 | Kidron | G06F 16/435 |
| | | | | 711/118 |
| 2017/0272485 | A1* | 9/2017 | Gordon | H04L 63/062 |
| 2019/0235845 | A1* | 8/2019 | Watanabe | G06F 8/35 |
| 2020/0236187 | A1* | 7/2020 | Tal | H04L 63/0281 |
| 2021/0081153 | A1* | 3/2021 | Nuggehalli | G06F 3/1267 |
| 2021/0390182 | A1* | 12/2021 | Boutnaru | G06F 21/52 |
| 2022/0286360 | A1* | 9/2022 | Gali | H04L 41/122 |
| 2023/0099370 | A1* | 3/2023 | Parla | H04L 41/22 |
| | | | | 709/224 |

FOREIGN PATENT DOCUMENTS

| | | |
|---|---|---|
| CN | 106534935 A | 3/2017 |
| CN | 106681806 A | 5/2017 |
| CN | 106790006 A | 5/2017 |
| CN | 111232022 A | 6/2020 |
| CN | 111278017 A | 6/2020 |
| CN | 111385363 A | 7/2020 |
| WO | 2014063015 A2 | 4/2014 |

OTHER PUBLICATIONS

First office action by the CNIPA of the prior application 202011278716.X dated Jul. 20, 2021, with English translation.
International Search Report of the counterpart application PCTCN2020137307 dated Aug. 18, 2021.
Written Opinion of The International Searching Authority of the counterpart application PCTCN2020137307 dated Aug. 18, 2021.
First office action by the CNIPA of the prior application 2020112787704 dated Nov. 8, 2023, with English translation.
First search report by the CNIPA of the prior application No. CN2020112787704. no date /lc/.
Second office action by the CNIPA of the prior application 202011278716.X dated Mar. 3, 2022, with English translation.
Supplementary search report by the CNIPA of the prior application No. CN202011278716X. no date /lc/.
Third office action by the CNIPA of the prior application 202011278716.X dated Jul. 14, 2022, with English translation.

* cited by examiner

RESOURCE ALLOCATION METHOD, DEVICE AND AUDIO-VISUAL PLAYBACK TERMINAL

CROSS-REFERENCE TO RELATED APPLICATIONS

This application is a United States National Stage Application filed under 35 U.S.C 371 of PCT Patent Application No. PCT/CN2020/137307, filed Dec. 17, 2020, which claims priority to Chinese Patent Application No. 2020112787704, filed with the Chinese Patent Office on Nov. 16, 2020, entitled "Resource Allocation Method, Device And Audio-Visual Playback Terminal", and Chinese Patent Application No. 202011278716X, filed with the Chinese Patent Office on Nov. 16, 2020, entitled "Multi-resource Management System, Smart Television, and Readable Storage Medium", which are incorporated herein by reference in their entireties.

TECHNICAL FIELD

The present disclosure relates to the field of video playback (or play) technologies, and in particular to a method and apparatus for resource allocation and an audiovisual playback terminal.

BACKGROUND ART

As televisions have more and more diversified functions, for example, have many functions such as recording, live broadcasting, picture-in-picture, and replay, different internal software and hardware devices in television terminals should be used in the use of different services. However, in the prior art, when multiple services are required at the same time, resource conflicts will occur and internal resources in the television cannot be utilized maximally and reasonably, because the entire set of resources will be occupied when one service is used.

SUMMARY

In view of the above, one of the objects of the present disclosure is to overcome the drawbacks in the prior art and provide a method and apparatus for resource allocation and an audiovisual playback terminal.

An embodiment of the present disclosure provides a resource allocation method, which is applicable to a resource allocation system in an audiovisual playback terminal. The audiovisual playback terminal includes multiple device entities. The resource allocation system includes a resource configurator and several service instances each having its own instance attribute. The method includes:

causing the resource configurator to respond to a path requesting request from at least one target service instance, each of the path requesting requests containing a device entity list required by the target service instance in implementation of a service function;

allocating device entities in accordance with a preset resource allocation rule according to the instance attribute and the device entity list of each target service instance to create a path for each target service instance, so that the target service instance can invoke the device entities in the corresponding path to achieve the corresponding service function.

In a possible implementation, the instance attribute of the service instance contains a preset priority. The allocating device entities in accordance with a preset resource allocation rule according to the instance attribute and the device entity list of each target service instance to create a path for each target service instance includes:

if there are path requesting requests from multiple target service instances, allocating device entities for each target service instance in sequence in a descending order of priority;

determining, during allocation of device entities for a single target service instance, several required target device entities according to the device entity list, sequentially acquiring the individual target device entities and allocating them to the target service instance, and then creating a corresponding path.

In a possible implementation, during allocation of device entities for a single target service instance, the sequentially acquiring the individual target device entities and allocating them to the target service instance includes:

judging, for each target device entity, whether the current target device entity is unique;

if the current target device entity is a uniquely constrained resource, judging whether the current target device entity is available, and allocating the current target device entity to the target service instance when it is available;

if the current target device entity is not a uniquely constrained resource, judging whether the current target device entity supports shared use, if the current target device entity supports shared use, allocating the current target device entity to the target service instance;

if the current target device entity supports exclusive use, judging whether the current target device entity is available, and allocating the current target device entity to the target service instance when it is available.

In a possible implementation, the resource allocation method further includes:

when it is judged that the current target device entity is a uniquely constrained resource and is currently unavailable, marking a path in which the current target device entity is being used as a conflicting path, and notifying a service instance corresponding to the conflicting path to release the current target device entity.

In a possible implementation, the resource allocation method further includes:

when it is judged that the current target device entity supporting exclusive use is unavailable, saving path information about a low-priority service instance using the current target device entity, so as to be configured to preempt the current target device entity;

before the preemption of the current target device entity, the method further includes:

judging whether a device entity necessary for path creation has been allocated to the target service instance, and invoking, when "Yes" is judged, the current target device entity from the low-priority service instance according to the path information;

if the invoking fails, judging whether the target service instance supports a waiting function, and bringing the target service instance into a waiting state when it supports the waiting function, otherwise returning a failure.

In a possible implementation, in the process of invoking the current target device entity, the resource allocation method further includes:

if there are multiple paths of service instances using the target device entity, selecting and invoking the current target device entity from a service instance with the lowest priority.

In a possible implementation, in the process of allocating device entities for each target service instance in sequence in a descending order of priority, the method further includes:

if there are multiple target service instances with the same priority, performing operation of allocating device entities to the multiple target service instances sequentially in accordance with a rule of prioritizing the latter.

An embodiment of the present disclosure further provides a multi-resource management system, which is applicable to a smart television containing multiple device resources. The multi-resource management system includes a resource manager and several component instances. Each component instance is pre-configured with device resource information configured to be required in implementation of a corresponding service function.

The component instance is configured to request a path from the resource manager according to a service implementation requirement.

The resource manager is configured to allocate device resources according to the device resource information corresponding to the component instance to create the path.

The component instance is further configured to invoke device resources in the path to implement the corresponding service function.

In a possible implementation, the resource manager includes a retained path requesting interface and a retained path regularizing interface.

Here, the component instance is configured to request a retained path from the resource manager via the retained path requesting interface, and is further configured to request the resource manager to regularize the retained path to a currently available path via the retained path regularizing interface.

In a possible implementation, the resource manager further includes at least one of a path release interface, a resource query interface, a playback capability query interface, an event notification interface, and a path reservation interface.

Here, the component instance is configured to request the resource manager to release the path via the path release interface.

The component instance is configured to query the resource manager via the resource query interface for information on a status of a corresponding device resource in a corresponding path.

The component instance is configured to query the resource manager via the playback capability query interface for information on programs, playback of which is restricted by resource usage, or their frequency point information.

The resource manager is configured to notify, via the event notification interface, the corresponding component instance of an event that the device resource is preempted or the device resource is available.

A component instance supporting a reservation function is further configured to reserve currently unavailable device resources from the resource manager via the path reservation interface.

In a possible implementation, the path includes a path resource activating interface, a path resource deactivating interface, and a command sending interface.

Here, the component instance is configured to bring device resources in a corresponding path into an activated state and establish a connection between the corresponding device resources in the corresponding path via the path resource activating interface after the path is created.

The component instance is configured to perform an operation of deactivating the device resources in the path that are in the activated state via the path resource deactivating interface when the component instance quits running.

The component instance is configured to send a command to a specified device resource in the path via the command sending interface, so that a corresponding operation is executed by the specified device resource.

In a possible implementation, the path further includes a register callback interface and an unregister callback interface.

Here, the component instance is configured to perform register callback monitoring for a specified device resource in the path via the register callback interface, and is further configured to cancel register monitoring for the registered specified device resource via the unregister callback interface.

In a possible implementation, each component instance is configured with a related instance attribute containing an instance type. The instance type includes autonomous component instances and dependent component instances, where the autonomous component instance is configured to autonomously perform the operations of requesting resource allocation and requesting a path, and each dependent component instance will depend on an associated autonomous component instance to perform the operations of requesting resource allocation and requesting a path.

In a possible implementation, the device resource information includes the types and number of device resources required by the corresponding component instance, where each of the device resources has a corresponding resource attribute. The resource attribute includes an attribute indicating whether the corresponding device resource is a unique resource, an attribute indicating whether the corresponding device resource is a device resource necessary for path creation, and a device resource type, where the device resource type includes shared device resources and exclusive device resources.

An embodiment of the present disclosure further provides a smart television. The smart television includes a processor and a memory. The memory stores a computer program. The processor is configured to execute the computer program to implement the functions of the multi-resource management system described above.

In a possible implementation, the smart television includes multiple device resources. The device resource includes one or a combination of more of a common interface for viewing of paid programs, an electronic program guide interface, a program specific information filter, a decoder, a video output interface, a software upgrade module, and a front-end tuner.

An embodiment of the present disclosure further provides a resource allocation apparatus, which is applicable to a resource allocation system in an audiovisual playback terminal. The audiovisual playback terminal includes multiple device entities. The resource allocation system includes a resource configurator and several service instances each having its own instance attribute. The apparatus is applied to the resource configurator. The apparatus includes:

a request responding module, configured to respond to a path requesting request from at least one target service instance, each of the path requesting requests containing a device entity list required by the target service instance in implementation of a service function; and a resource allocation module, configured to allocate device entities in accordance with a preset resource allocation rule according to the instance attribute and the device entity list of each target service instance to create a path for each target service instance, so that the target service instance can invoke the device entities in the corresponding path to achieve the corresponding service function.

An embodiment of the present disclosure further provides an audiovisual playback terminal. The audiovisual playback terminal includes a processor and a memory. The memory stores a computer program. The processor is configured to execute the computer program to implement the resource allocation method described above.

An embodiment of the present disclosure further provides a readable storage medium, storing a computer program that, when executed, implements the resource allocation method described above.

The embodiments of the present disclosure have at least the following advantageous effects.

In the resource allocation method of the present disclosure, resources are managed based on a resource configurator, service instance, and an architecture of path. Moreover, resources are allocated in accordance with a preset resource allocation rule in combination with instance attributes of the service instances and device entity characteristics. Especially during live broadcast, it can be not only ensured that these service instances can be implemented normally and the problem of conflicts in use of services can be solved, but also the resources can be maximally utilized.

BRIEF DESCRIPTION OF THE DRAWINGS

In order to more clearly illustrate technical solutions of embodiments of the present disclosure, drawings required for use in the embodiments will be described briefly below. It is to be understood that the drawings below are merely illustrative of some embodiments of the present disclosure, and therefore should not be considered as limiting its scope. It will be understood by those of ordinary skill in the art that other relevant drawings can also be obtained from these drawings without any inventive effort.

DETAILED DESCRIPTION OF THE EMBODIMENTS

The technical solutions of the embodiments of the present disclosure will be described below clearly and completely with reference to the accompanying drawings of the embodiments of the present disclosure. It is apparent that the embodiments to be described are some, but not all of the embodiments of the present disclosure.

Hereinafter, the terms "comprising", "including", "having", and their cognates as used in various embodiments of the present disclosure are merely intended to indicate specific features, numbers, steps, operations, elements, components or combinations of the foregoing items, and should not be construed as precluding the possibility of the presence of one or more other features, numbers, steps, operations, elements, components or combinations of the foregoing items or the addition of one or more features, numbers, steps, operations, elements, components or combinations of the foregoing items.

Unless otherwise defined, all terms (including technical and scientific terms) used herein have the same meanings as commonly understood by those of ordinary skill in the art to which the various embodiments of the present disclosure pertain. The terms (such as those defined in commonly used dictionaries) should be interpreted as having the same meanings as those in the context of the relevant art and will not be interpreted in an idealized or overly formal sense unless expressly so defined in the various embodiments of the present disclosure.

Figure 1:
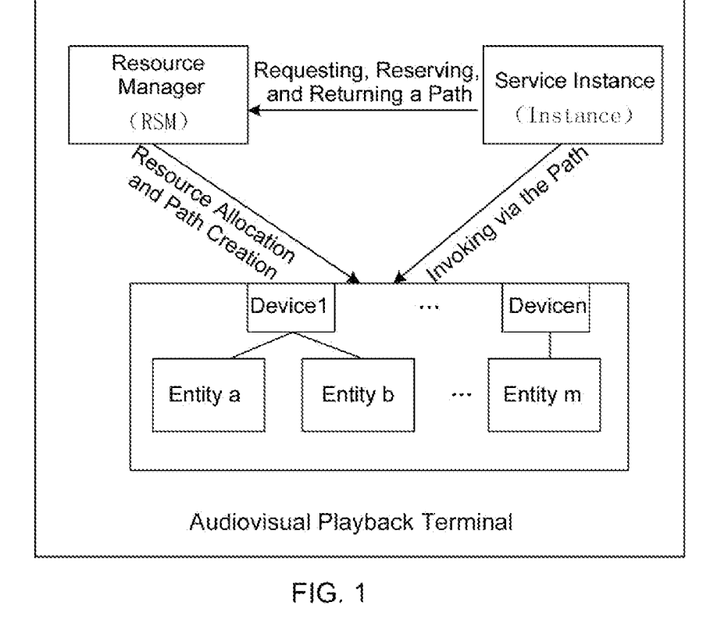
FIG. 1 shows a schematic diagram showing an application of a resource allocation method according to an embodiment of the present disclosure.
Figure 2:
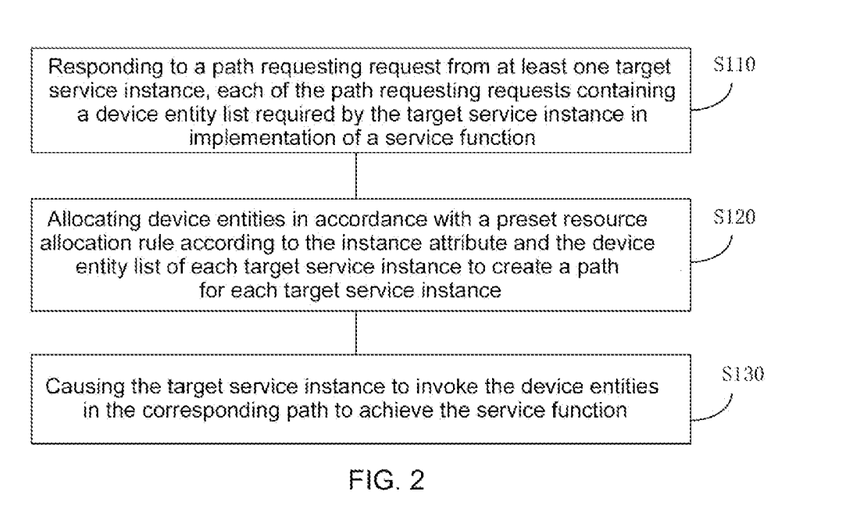
FIG. 2 shows a first schematic flowchart of a resource allocation method according to an embodiment of the present disclosure.

Referring to FIGS. 1 and 2, the present disclosure proposes a resource allocation method, which is applicable to an audiovisual playback terminal such as a television or a computer to achieve reasonable configuration of playback device resources to solve the problem of conflicts in use of services, thereby improve user experience, for example.

Generally, the audiovisual playback terminal includes multiple devices, and each device often includes at least one device entity. When a certain service is to be executed, the terminal will use one or more entities of some devices in an orderly combination to achieve the purpose of implementing the service function. Generally, various hardware devices are packaged as corresponding device entities in order to facilitate invoking (or call) of underlying hardware by an upper-layer application of the terminal. In this way, when it is necessary to use a certain function of a certain device, the corresponding device entity can be directly invoked. It should be understood that the device entity described in the present disclosure refers to resources of the device.

The audiovisual playback terminal of the present disclosure is provided with a resource allocation system, in order to achieve different service functions by utilizing the limited software and hardware resources in the terminal. As shown in FIG. 1, exemplarily, the resource allocation system mainly includes a resource configurator and several service instances, where the resource configurator is mainly configured to allocate resources required by each service instance when performing a corresponding service function and to create a path for the corresponding service instance by utilizing these allocated resources, so that the service instance can control these allocated resources via the path. Of course, if the execution of the corresponding service instance is completed, the resource configurator may be requested to release the allocated resources and the path may be returned to the resource configurator. It can be understood that a path is created and device entities required are controlled via the path in a video playback process. In this way, especially during live broadcast, a variety of service functions can be achieved for different requirements of users, whereby user experience can be improved.

An orderly combination of multiple devices is usually required, in order to satisfy the normal operation of each service instance. In the present disclosure, a route along which data flows through each device in the combination is defined as the path. It can be understood that the creation and use of paths can allow service instances to normally invoke these allocated device entities in their corresponding paths, and device resources can be maximally utilized while ensuring no conflicts for some sharable device entities. In the present disclosure, the service instances refer to service instances of an autonomous type capable of autonomously requesting resources and paths. Of course, some service instances of a dependent type must depend on their associated autonomous service instances to request paths.

As shown in FIG. 2, the resource allocation method will be described in detail below.

In S110, a response is made to a path requesting request from at least one target service instance. Here, each path requesting request (i.e., request for requesting a path) contains a list of device entities required by the target service instance in implementation of a service function.

Exemplarily, when the resource configurator receives a path requesting request(s) from one or more target service instances, the resource configurator will acquire, from these path requesting requests, device entity lists required by the corresponding target service instances. Here, the device entity list stores specific device entity information, such as the names and number of device entities required, etc.

A smart television is taken as an example. Its service instances may include, but are not limited to, recording service instances, picture-in-picture playback service instances, replay service instances, and so on. For example, for a main window playback (MP) service instance, the resource configurator will acquire its device entity list and then determine that device entities such as a decoder and a Vout (video output interface) are required.

In S120, device entities are allocated in accordance with a preset resource allocation rule according to the instance attribute and the device entity list of each target service instance to create a path for each target service instance.

Figure 3:
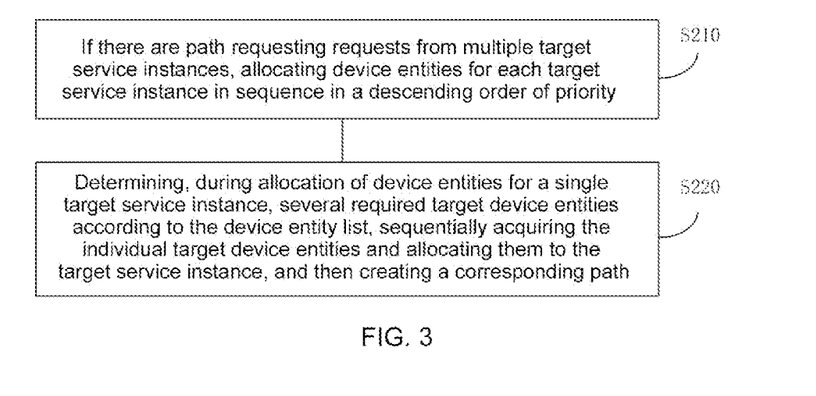
FIG. 3 shows a second schematic flowchart of a resource allocation method according to an embodiment of the present disclosure.

Exemplarily, after the resource configurator determines the device entities required by the corresponding target service instance, the resource configurator will allocate resources according to a preset resource allocation rule to create a corresponding path. In a possible implementation, as shown in FIG. 3, the preset resource allocation rule in step S120 described above includes S210 and S220.

In S210, if there are path requesting requests from multiple target service instances, device entities are allocated for each target service instance in sequence in a descending order of priority.

In the present disclosure, the resource configurator will allocate resources in a synchronous manner. In other words, a request for resources and path from only one service instance can be dealt with at one time. Exemplarily, when multiple target service instances request resources, resources will be allocated sequentially to these target service instances. In a possible implementation, the instance attribute may include, but is not limited to, priority and so on. For example, a priority may be set for each service instance in advance. Generally, a service instance with higher priority should be prioritized. Then, the individual service instances are dealt with in order of their priorities. In addition, the instance attribute may also include a mode in which the service instance uses resources, an attribute indicating whether the service instance supports a waiting function, and so on. Here, for a service instance supporting the waiting function, a path may be reserved to reserve device entities required for creation of the path in advance.

Further optionally, if it is necessary to deal with multiple target service instances with the same priority, device entity allocation operations may be performed for the multiple target service instances sequentially in accordance with a rule of prioritizing the latter. The latter is prioritized to ensure a faster response to the user's most recent operation requirement for service instances with the same priority, thereby improving user experience.

In S220, during allocation of device entities for a single target service instance, several required target device entities are determined according to the device entity list, the individual target device entities are sequentially acquired and allocated to the target service instance, and then a corresponding path is created.

Figure 4:
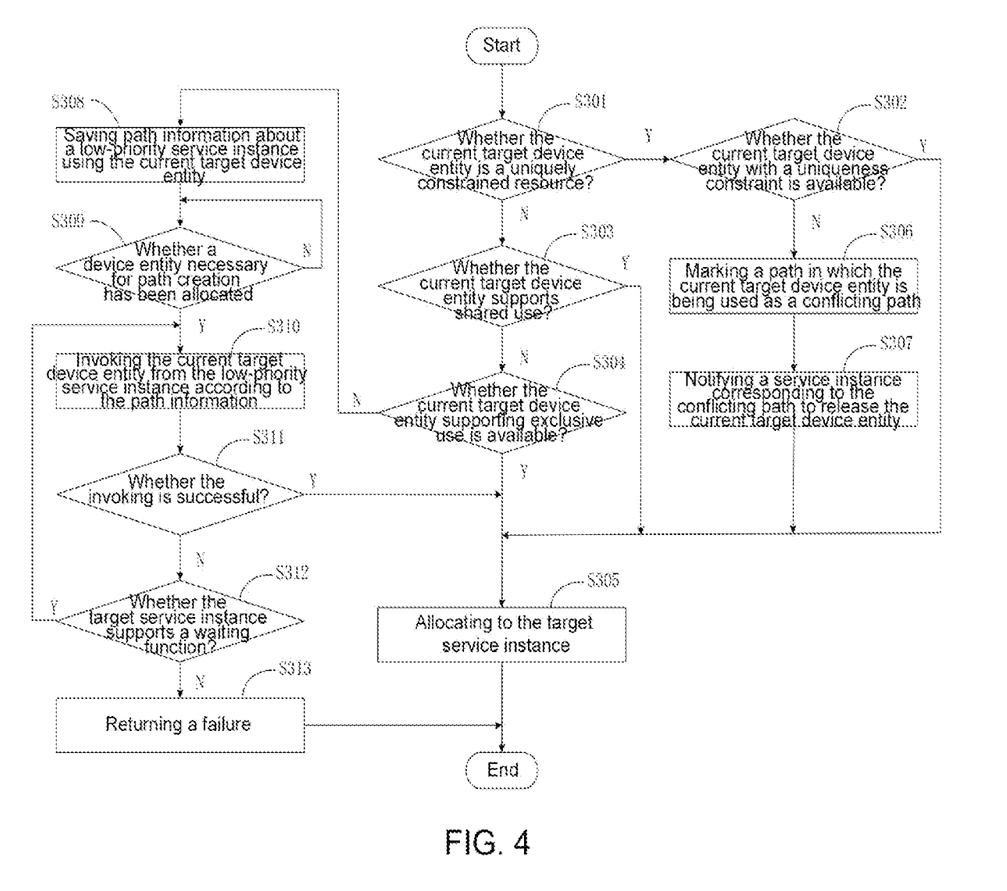
FIG. 4 shows a third schematic flowchart of a resource allocation method according to an embodiment of the present disclosure.

Exemplarily, for a single target service instance, the resource configurator will determine target device entities to be allocated according to its device entity list, and then a path is created after the individual target device entities are allocated. Considering that some resources are unique and some resources may be shared for use in the terminal, different device entities will be reasonably allocated in the present disclosure according to device characteristics of these device entities. In a possible implementation, exemplarily, as shown in FIG. 4, the process of allocating the individual target device entities includes following steps.

In S301, whether the current target device entity is a uniquely constrained resource is judged.

If it is a uniquely constrained resource, step S302 is executed. Otherwise, step S303 is executed. Exemplarily, the term "uniquely constrained" (uniqueness constraint) means that the device entity is unique. Generally, if the device entity is currently being invoked, this resource can be allocated again only after it is released.

In S302, it is judged whether the current target device entity with a uniqueness constraint is available.

If a target device entity with a uniqueness constraint is currently in an available state, it is indicated that it is currently in an idle state, and then step S305 is executed. Optionally, if it is unavailable, it is indicated that the target device entity is being used, and then steps S306 and S307 are executed.

In S303, it is judged whether the current target device entity supports shared use.

If the current target device entity supports shared use, step S305 is executed. Otherwise, it is indicated that the device entity is an exclusive device, and step S304 is executed. For example, in some smart televisions, resources such as FE (a front-end tuner) and CI (a common interface for viewing of paid programs) can be shared, while resources such as Vout (a video output interface) and a decoder cannot be shared for use. It can be understood that, by prioritizing the use of device entities supporting shared use, more available resources can be retained for subsequent service instances, and resources can also be maximally utilized.

In S304, it is judged whether the current target device entity supporting exclusive use is available.

If the device entity supporting exclusive use is currently in an available state, step S305 is executed. Optionally, if the target device entity supporting exclusive use is currently in an unavailable state, step S308 is executed. Here, the saved path information will be able to be configured for subsequent preemption and invoking of the current target device entity. Of course, preemption or non-preemption may be specifically determined according to a preset corresponding condition.

In S305, the target device entity is allocated to the target service instance.

Exemplarily, when the resource configurator determines that the target device entity is available, the target device entity will be allocated to the current target service instance, and then a unique path will be created for the target service instance based on these allocated target device entities. During resource allocation, for example, operations such as path marking and status locking may be performed.

For the foregoing step S302, optionally, the method further includes:

S306 of marking a path in which the current target device entity is being used as a conflicting path;

S307 of notifying a service instance corresponding to the conflicting path to release the current target device entity.

Exemplarily, for the current target device entity with uniqueness constraint characteristic, when it is unavailable, a path in which it is currently located is marked as a conflicting path, that is, marked as a Crash path. It can be understood that the target device entity has a uniqueness constraint and thus can be invoked only when it is idle. Hence, the resource configurator may notify a service instance that is using the resource to release the resource, and the resource is invoked after it is released. Especially those resources affecting the creation of paths will, for example, affect the creation of the paths if they are not obtained.

For the foregoing step S304, optionally, the method further includes:

S308 of saving path information about a low-priority service instance using the current target device entity. It can be understood that if preemption of resources is required subsequently, resources may be preempted and invoked from a corresponding path according to the path information.

Further optionally, as shown in FIG. 4, the method further includes:

S309 of judging whether a device entity necessary for path creation has been allocated to the current target service instance;

S310 of invoking the current target device entity from the low-priority service instance according to the path information.

Exemplarily, if a device necessary for path creation has been obtained, step S310 may be executed. In this way, it can be ensured that it is of significance to invoke resources from a low-priority service instance. In addition, for example, a waiting time before preemption and invoking of the device entity from the low-priority service instance can be reduced.

In a possible implementation, regarding the saved path information described above, optionally, if there are multiple paths of service instances using the target device entity, the current target device entity is selected and invoked from the service instance with the lowest priority.

Further optionally, for the foregoing step S310, the method further includes:

S311 of judging whether the invoking is successful.

If the invoking is successful, step S305 is executed. Otherwise, step S312 is executed.

In S312, it is judged whether the target service instance supports a waiting function.

If the target service instance supports the waiting function, it is brought into the waiting state, and then invoking from these low-priority service instances is continued or invoking is performed after it is changed into the idle state. Otherwise, step S313 is executed.

In S313, an invoking failure is returned.

It can be understood that the next target device entity will be allocated in accordance with the same steps described above. Here, different target device entities may be acquired simultaneously, or device entities necessary for path creation may be acquired preferentially before other device entities are acquired. Of course, the device entities may be acquired in a sequence set in the device entity list.

After the resource configurator allocates the required resources to the target service instance, a corresponding unique path will be created, and then execute step S130 will be executed.

In S130, the target service instance invokes the device entities in the corresponding path to achieve the service function.

Exemplarily, after the path is successfully created, the target service instance will control these device entities via the path, for example, send a corresponding control command to implement the corresponding service function.

The resource allocation method of the present disclosure is based on a management architecture of a resource configurator and service instances. In other words, when a service instance is to be implemented, the resource configurator is requested to allocate resources and create a path. Resources are allocated in accordance with a preset resource allocation rule in combination with the instance attributes of the service instances and the device entity characteristics. In this way, it can be not only ensured that these service instances can be implemented normally and the problem of conflicts in use of services can be solved, but also the resources can be maximally utilized. Furthermore, if the service instance is not implemented, the path may be returned to release the device resources from the path, so that the device resources can be easily invoked by other service instances.

Referring to FIG. 1, the present disclosure proposes a multi-resource management system, which is mainly used in a smart television. Here, the smart television is equipped with a multi-resource management system. The multi-resource management system allows, for example, flexible utilization of internal device resources of the smart television.

Generally, a smart television may include multiple device resources. For example, it may include, but is not limited to, device resources such as a common interface (CI) for viewing of paid programs, an electronic program guide (EPG) interface, a program specific information filter (PSI_Filter), a decoder, a video output (Vout) interface, an over-the-air (OTA) upgrade module, a front-end (FE) tuner, and so on. Since it may be necessary to use all these device resources when implementing different service functions, a multi-resource management system is proposed in the present disclosure to manage these resources in a unified manner, in order to avoid resource conflicts. Especially in a live broadcast service, the concept of the path is proposed for flexibly allocating and invoking resources according to service requirements to solve the conflict of service resources, whereby user experience can be improved.

Figure 5:
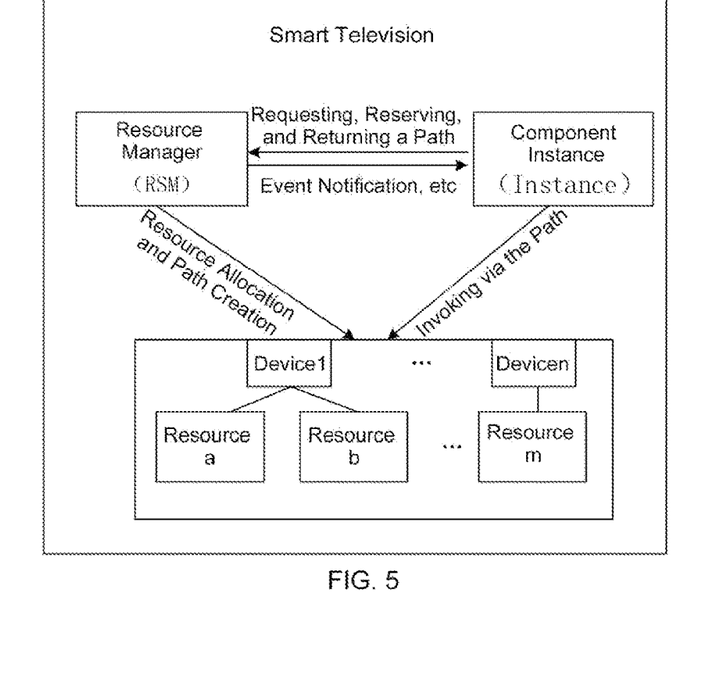
FIG. 5 shows a schematic structural diagram of a multi-resource management system according to an embodiment of the present disclosure.

Exemplarily, as shown in FIG. 5, the multi-resource management system includes a resource manager and several component instances, where each component instance may be pre-configured with device resource information configured to be required in implementation of a corresponding service function. In the present disclosure, an instance that undertakes a certain service function is defined as a component instance. The component instance may also be referred to as a service instance. In a smart television, there are often multiple corresponding component instances due to different service functions such as recording, replay, picture-in-picture, and live broadcast.

Figure 6:
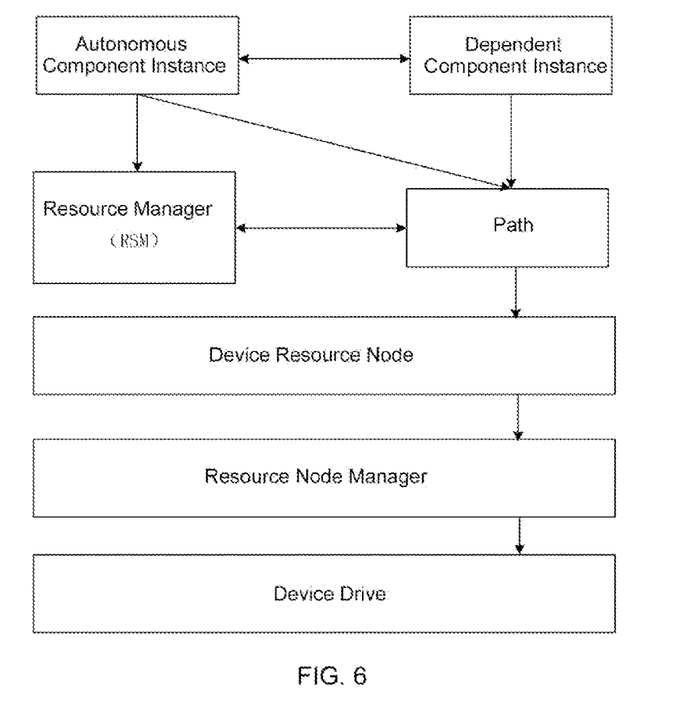
FIG. 6 shows another schematic structural diagram of a multi-resource management system according to an embodiment of the present disclosure.

Each component instance is configured with related instance attributes, which may, for example, include, but not limited to, an instance type, priority, an attribute indicating whether to support a reservation function, a mode of use of resources, and so on. Here, the instance type includes autonomous component instances and dependent component instances. As shown in FIG. 6, the autonomous component instance can autonomously perform the operations of requesting resource allocation and requesting a path from the resource manager. The dependent component instance must depend on a corresponding associated autonomous component instance to perform the operations of requesting resource allocation and requesting a path, because it does not have the authority to request a path by itself.

In the present disclosure, the component instance is configured to request a path from the resource manager according to a service implementation requirement. Exemplarily, when a component instance needs to implement a service function, it will be necessary to request a path from the resource manager. Here, each component instance is pre-configured with device resource information configured to be required in implementation of a corresponding service function, thus all device resources required by the component instance for implementing the service function will be allocated in the path.

Figure 7:
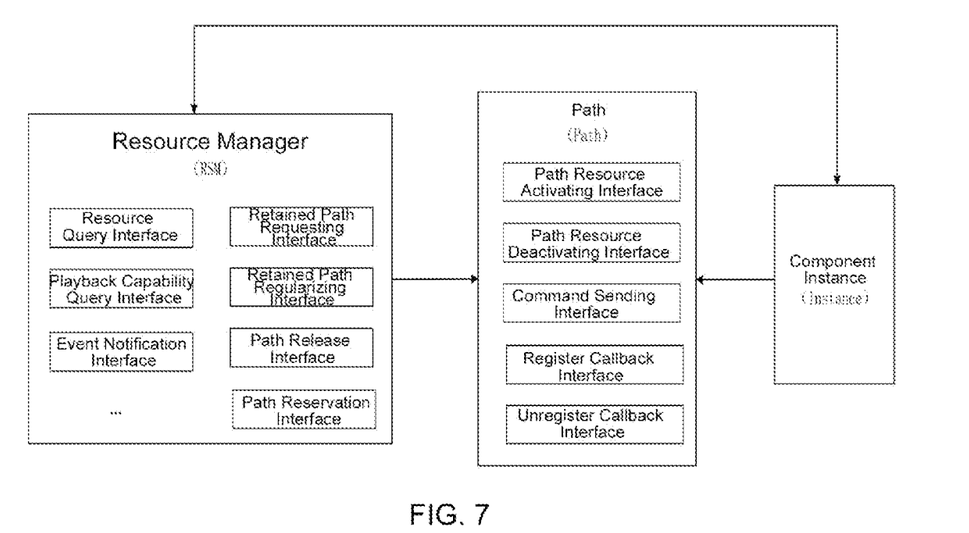
FIG. 7 shows a schematic diagram showing implementation of an instance in a multi-resource management system according to an embodiment of the present disclosure.

Exemplarily, as shown in FIG. 7, the resource manager includes a retained path requesting interface and a retained path regularizing interface, wherein the component instance is configured to request a retained path from the resource manager via the retained path requesting interface. Furthermore, the component instance is further configured to request the resource manager to regularize the retained path to a currently available path via the retained path regularizing interface. Since the retained path may contain a device resource being used, the resource manager will update the status of the normally used device resource and the status of the path when its regularization is requested. It can be understood that the retained path can be used normally only after the path is regularized.

Optionally, the resource manager further includes a path reservation interface. For example, for some component instances supporting the reservation function, the path reservation interface may be invoked to reserve a path from the resource manager. In one embodiment, if a required device resource is found to be currently available, the resource manager may allocate the resource directly to the component instance so that the resource is configured for creating a path. Conversely, if there is a lack of device resources or some device resources are currently unavailable, the resource manager will record the scheduling waiting status of the component instance, so that some device resources, when become available, will be allocated to the component instance which is reserving the resources. Optionally, if multiple component instances are reserving the device resource, the device resource may be allocated in order of priority of the component instances.

In the present disclosure, the resource manager is configured to allocate device resources according to device resource information corresponding to a component instance to create a path. Exemplarily, in one embodiment, when the resource manager receives a request for requesting a path, the resource manager acquires information on device resources required by the corresponding component instance according to the request, and then allocates the required device resources to the component instance and then creates a path. As shown in FIG. 7, once the path is successfully created, the component instance may activate and invoke the corresponding device resources in the path. For the invoked device resource node, a corresponding underlying hardware device will be driven by a corresponding resource node manager to finally achieve the corresponding service function.

As mentioned above, the device resource information may include, but is not limited to, the types and number of device resources required by the corresponding component instance. Here, each device resource in the smart television has a corresponding resource attribute, thus the resource manager can reasonably allocate the device resources according to the resource attributes of these device resources and the instance attributes of the corresponding component instances. It can be understood that, in actual use, the resources can be flexibly allocated based on the multi-resource management system, thus the specific allocation rule is not limited herein.

For example, the resource attribute may include an attribute indicating whether the corresponding device resource is a unique resource, an attribute indicating whether the corresponding device resource is a necessary device resource, a device resource type to which it belongs, and so on, where the device resource type includes shared device resources and exclusive device resources. The shared device resource refers to a device resource which may be shared and used by different service instances. For example, the FE in some smart televisions is allowed to be shared and used by programs of the same frequency. The exclusive device resource refers to a device resource which is only allowed to be used by one service instance at a certain time and can be invoked by the next service instance only after it is idle. For example, decoders and Vout interfaces in smart televisions often do not support shared use.

An orderly combination of multiple devices is usually required, in order to satisfy the normal operation of a certain service instance. In the present disclosure, a route along which data flows through each device in the ordered combination is defined as a path. Exemplarily, a corresponding path will be created when the resource manager allocates the required device resources to the corresponding component instance. In one embodiment, the allocated device resources are marked in the path of the corresponding component instance and their usage statuses are modified. Related path interfaces may also be configured.

Exemplarily, as shown in FIG. 6, the path may include a path resource activating interface, a path resource deactivating interface, a command sending interface, and so on, where the path resource activating interface is mainly configured to enable the component instance to bring device resources in the corresponding path into an activated state and establish a connection between the corresponding device resources in the corresponding path. The component instance is configured to perform an operation of deactivating the device resources in the path that are in the activated state via the path resource deactivating interface when the component instance quits running. The component instance is configured to send a command to a specified device resource in the path via the command sending interface, so that a corresponding operation is executed by the specified device resource.

For example, after a certain component instance requests and obtains a path, it is necessary to activate corresponding device resources in the path so that these devices can be controlled. For example, a connection between resources in the path may be established by invoking the ActivateActors interface (i.e., the path resource activating interface) of the path. After the device resources are activated, a control command may be sent to the corresponding device resources by invoking the SendDeviceCmd interface (i.e., the command sending interface). After the execution of the operation is completed, when the component instance quits running, these activated device resources may be deactivated by invoking the DeactiveActors interface (i.e., the path resource deactivating interface).

Optionally, the path further includes a register callback interface, an unregister callback interface, and other interfaces, where the register callback interface is mainly configured to enable the component instance to perform register callback monitoring for a specified device resource in the path. The unregister callback interface is mainly configured to cancel register monitoring for the registered specified device resource. Exemplarily, in one embodiment, when the component instance invokes the RegisterCallback interface (i.e., the register callback interface) of its path, registration of one or some specific device resources may be monitored via this interface. When registration monitoring is no longer needed, the registration monitoring operation may be canceled by invoking the UnregisterCallback interface (i.e., the unregister callback interface).

Further, if some component instance, which has requested a path, no longer needs the path, the path may be returned to the resource manager. Based on this consideration, optionally, the resource manager further includes a path release interface. The path release interface is mainly configured to enable the component instance to request the resource manager to release the path. For example, when the component instance no longer needs to use the path, the path release interface may be invoked to request release of the path. Then the resource manager will update the status of the path and the usage status of resources in the path. For example, the path may be brought into an ineffective state, and some resources that are no longer needed may be changed from the occupied state to an idle state. It can be understood that those device resources in the idle state may be reallocated by the resource manager after the path is released, namely, after the path is returned.

Further, considering that the component instance and the resource manager need to interact with each other regarding other information such as resource status information, optionally, the resource manager further includes at least one of a resource query interface, a playback capability query interface, an event notification interface, and the like, and may, of course, further include other functional interfaces, which are not limited here and may be specifically set according to actual requirements.

The above-mentioned resource query interface is mainly configured to enable the component instance to query the resource manager for information on the status of a corresponding device resource in the corresponding path. For example, when the component instance needs to know whether certain device resources are in a normal operating state, the information may be acquired by invoking the resource query interface. The playback capability query interface is mainly configured to enable the component instance to query the resource manager for information on programs, playback of which is restricted by resource usage, or their frequency point information. It can be understood that programs supporting playback that are filtered out of the program list can be obtained by the playback capability query interface. In addition, during resource scheduling and allocation, the resource manager may also notify, via the event notification interface, the corresponding component instance of events such as an event that a device resource is preempted or a device resource is available.

It can be understood that the presence of multiple interfaces of the resource manager makes it easy for each component instance to request and reserve a path from the resource manager and return the path to the resource manager. At the same time, the resource manager may also provide services such as resource allocation to each component instance, so that the component instance can control these allocated device resources via the path to achieve the purpose of implementing a related service function.

The multi-resource management system according to the embodiment of the present disclosure is proposed with a new resource management architecture. The architecture includes the concepts of a resource manager, component instances, and paths. In other words, these device resources are managed and allocated by the resource manager in a unified manner. The component instances undertaking related service functions request paths from the resource manager, and the resource manager provides resource allocation services to the component instances, so that the individual component instances can invoke corresponding resources via their corresponding paths to achieve the service functions. Since the created paths contain the allocated resources, the multi-resource management system refines the device resource routes to facilitate the flexible allocation and combined use of device resources according to actual service requirements. In this way, these device resources can be utilized efficiently, whereby the problem of resource conflicts between services can be easily and effectively solved.

The present disclosure further proposes a smart television. Exemplarily, the smart television includes a processor and a memory, and some device resources such as those required for video playback. Here, the memory stores a computer program. The processor is configured to execute the computer program to implement the functions of the multi-resource management system described above, thereby achieving, for example, the management of the resources of the smart television. Here, the device resource may include one or a combination of a common interface for viewing of paid programs, an electronic program guide interface, a program specific information filter, a decoder, a video output interface, a software upgrade module, a front-end tuner, and the like.

Figure 8:
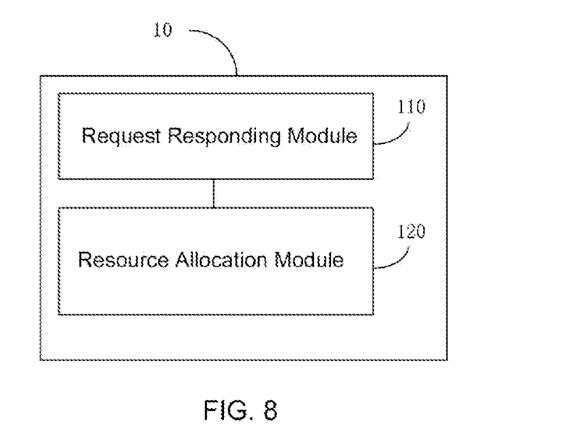
FIG. 8 shows a schematic structural diagram of a resource allocation apparatus according to an embodiment of the present disclosure.

Referring to FIG. 8, the present disclosure proposes a resource allocation apparatus 10 that is applicable to a resource allocation system in an audiovisual playback terminal, where the audiovisual playback terminal includes multiple device entities. Exemplarily, the resource allocation system includes a resource configurator and several service instances. Each service instance has its own instance attribute. The resource allocation apparatus is applied to the resource configurator and includes following modules.

The request responding module 110 is configured to respond to a path requesting request from at least one target service instance, each of the path requesting requests containing a list of device entities required by the target service instance in implementation of a service function.

The resource allocation module 120 is configured to allocate device entities in accordance with a preset resource allocation rule according to the instance attribute and the device entity list of each target service instance to create a path for each target service instance, so that the target service instance can invoke the device entities in the corresponding path to achieve the corresponding service function.

It can be understood that the respective modules of the present disclosure correspond to the respective steps of the foregoing first embodiment. Any optional option in the foregoing first embodiment is also applicable to the present disclosure, therefore a detailed description will be omitted here.

The present disclosure further provides an audiovisual playback terminal. Exemplarily, the audiovisual playback terminal includes a processor and a memory. The memory stores a computer program. The processor is configured to execute the computer program to implement the video playback control method of the foregoing embodiment. For example, the video playback device may be a smart television, a computer, or the like.

The present disclosure further provides a readable storage medium configured to store a computer program that, when executed, implements the resource allocation method described above.

In several embodiments according to the present disclosure, it should be understood that the disclosed apparatus and method may also be implemented in other ways. The embodiment of the apparatus described above is merely illustrative in nature. For example, the flow charts and block diagrams in the figures illustrate implementable architectures, functionalities, and operations of apparatuses, methods, and computer program products according to multiple embodiments of the present disclosure. In this regard, each block in the flow charts or block diagrams may represent a module, a program segment, or a portion of code, wherein the module, the program segment, or the portion of code includes one or more executable instructions for implementing specified logical function(s). It should also be noted that in some alternative implementations, the functions noted in the blocks may occur out of the order noted in the figures. For example, two blocks shown in succession may in fact be executed substantially concurrently, or they may sometimes be executed in a reverse order, depending upon the functionality involved. It will also be noted that each block of the block diagrams and/or flow charts, and combinations of blocks in the block diagrams and/or flow charts, may be implemented by special purpose hardware-based systems that execute the specified functions or actions, or by a combination of special purpose hardware and computer instructions.

Besides, the individual functional modules or units in the embodiments of the present disclosure may be integrated together to form an independent part, or each of the modules may be physically stand-alone, or two or more of the modules may be integrated into an independent part.

When implemented in the form of a software functional module and sold or used as an independent product, the functions may be stored in a computer-readable storage medium. Based on such understanding, a technical solution of the present disclosure essentially, or the part thereof contributing to the prior art, or a part of the technical solution may be embodied in the form of a software product. The computer software product is stored in a storage medium and includes a number of instructions for causing a computer device (which may be a smart phone, a personal computer, a server, a network device, or the like) to execute all or some of the steps of the methods described in the various embodiments of the present disclosure. The preceding storage medium includes any medium that can store program codes, such as a USB flash disk, a mobile hard disk, a read-only memory (ROM), a random access memory (RAM), a magnetic disk, or an optical disk.

Although specific embodiments of the present disclosure are described above, the scope of protection of the present disclosure is not limited thereto. Any variations or alternatives that can be readily envisaged by those skilled in the art within the technical scope disclosed in the present disclosure are intended to be encompassed within the scope of protection of the present disclosure.

INDUSTRIAL APPLICABILITY

In the resource allocation method of the present disclosure, resources are managed based on a resource configurator, service instance, and an architecture of path. Moreover, resources are allocated in accordance with a preset resource allocation rule in combination with instance attributes of the service instances and device entity characteristics. Especially during live broadcast, it can be not only ensured that these service instances can be implemented normally and the problem of conflicts in use of services can be solved, but also the resources can be maximally utilized.

What is claimed is:

1. A multi-resource management system comprising a processor, wherein the multi-resource management system is applicable to a smart television containing multiple device resources, wherein the multi-resource management system comprises a resource manager and several component instances, wherein each of the component instances is pre-provided with device resource information configured to be required in implementation of a corresponding service function;
   each of the component instances is configured to request a path from the resource manager according to a service implementation requirement;
   the resource manager is configured to allocate device resources according to the device resource information corresponding to each of the component instances, so as to create the path; and
   each of the component instances is further configured to invoke device resources in the path, to implement a corresponding service function, wherein the resource manager comprises a retained path requesting interface and a retained path regularizing interface,
   wherein each of the component instances is configured to request a retained path from the resource manager via the retained path requesting interface, and is further configured to request the resource manager to regularize the retained path to a currently available path via the retained path regularizing interface, and wherein the resource manager further comprises at least one of a path release interface, a resource query interface, a playback capability query interface, an event notification interface, and a path reservation interface,
   wherein each of the component instances is configured to request the resource manager to release the path via the path release interface;
   each of the component instances is configured to query the resource manager, via the resource query interface, for information on a status of a corresponding device resource in a corresponding path;
   each of the component instances is configured to query the resource manager, via the playback capability query interface, for information on programs, playback of which is restricted by resource usage, or frequency point information thereof;
   the resource manager is configured to notify, via the event notification interface, a corresponding component instance of an event that a device resource is preempted or a device resource is available; and a component instance supporting a reservation function is further configured to reserve currently unavailable device resources from the resource manager via the path reservation interface.

2. The multi-resource management system according to claim 1, wherein the path comprises a path resource activating interface, a path resource deactivating interface, and a command sending interface,
- wherein each of the component instances is configured to bring device resources in a corresponding path into an activated state and establish a connection between corresponding device resources in the corresponding path, via the path resource activating interface, after the path is created;
- each of the component instances is configured to perform an operation of deactivating the device resources in the path, which are being in the activated state, via the path resource deactivating interface, when the one component instance quits running; and
- each of the component instances is configured to send a command to a specified device resource in the path via the command sending interface, so that a corresponding operation is executed by the specified device resource.

3. The multi-resource management system according to claim 2, wherein the path further comprises a register callback interface and an unregister callback interface,
- wherein each of the component instances is configured to perform register callback monitoring on the specified device resource in the path via the register callback interface, and is further configured to cancel register monitoring on a registered specified device resource via the unregister callback interface.

4. The multi-resource management system according to claim 1, wherein each of the component instances is provided with a related instance attribute containing an instance type, wherein the instance type comprises autonomous component instances and dependent component instances, wherein each of the autonomous component instances is configured to autonomously perform operations of requesting resource allocation and requesting a path, and each of the dependent component instances depends on an associated autonomous component instance, so as to perform the operations of requesting resource allocation and requesting a path.

5. The multi-resource management system according to claim 1, wherein the device resource information comprises types and number of device resources required by a corresponding component instance, wherein each of the device resources has a corresponding resource attribute, wherein the resource attribute comprises an attribute indicating whether a corresponding device resource is a unique resource, an attribute indicating whether the corresponding device resource is a device resource necessary for creating a path, and a type of the one device resource, wherein the type of the one device resource comprises a shared device resource and an exclusive device resource.

6. The multi-resource management system according to claim 1, wherein the path comprises a path resource activating interface, a path resource deactivating interface, and a command sending interface, wherein each of the component instances is configured to bring device resources in a corresponding path into an activated state and establish a connection between corresponding device resources in the corresponding path, via the path resource activating interface, after the path is created; each of the component instances is configured to perform an operation of deactivating the device resources in the path, which are being in the activated state, via the path resource deactivating interface, when the one component instance quits running; and each of the component instances is configured to send a command to a specified device resource in the path via the command sending interface, so that a corresponding operation is executed by the specified device resource.

7. The multi-resource management system according to claim 1, wherein the device resource information comprises types and number of device resources required by a corresponding component instance, wherein each of the device resources has a corresponding resource attribute, wherein the resource attribute comprises an attribute indicating whether a corresponding device resource is a unique resource, an attribute indicating whether the corresponding device resource is a device resource necessary for creating a path, and a type of the one device resource, wherein the type of the one device resource comprises a shared device resource and an exclusive device resource.

8. A smart television, comprising a processor and a memory, wherein the memory stores a computer program, and the processor is configured to execute the computer program, to implement functions of the multi-resource management system according to claim 1.

9. The smart television according to claim 8, comprising multiple device resources, wherein the device resources comprise one of a common interface for viewing of paid programs, an electronic program guide interface, a program specific information filter, a decoder, a video output interface, a software upgrade module and a front-end tuner, or a combination of more therefrom.

* * * * *